United States Patent Office 3,435,162
Patented Mar. 25, 1969

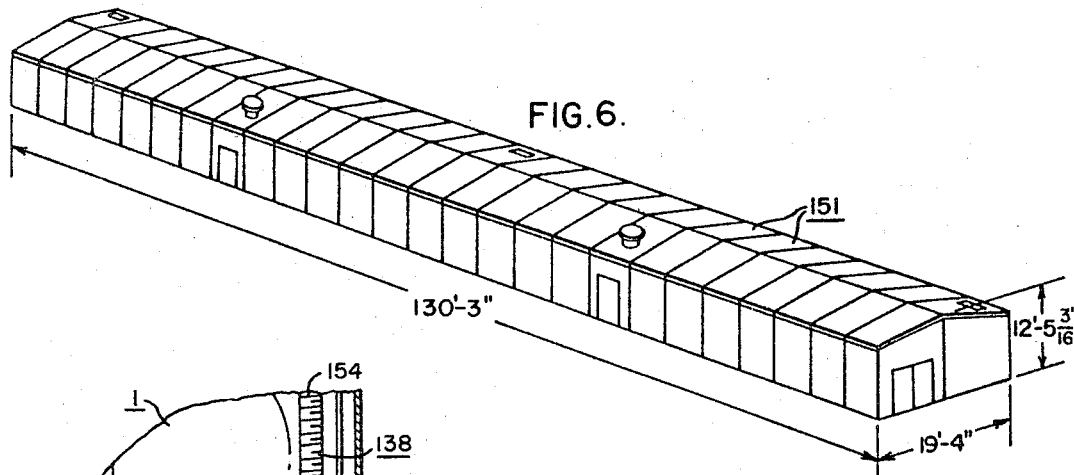
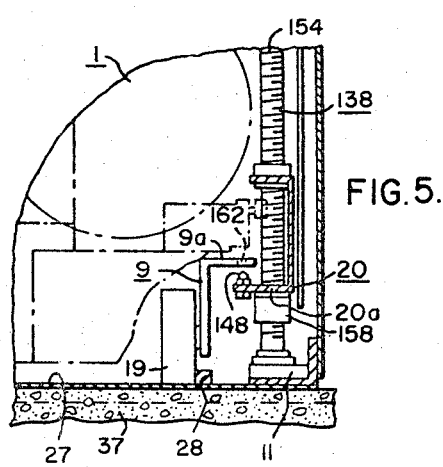
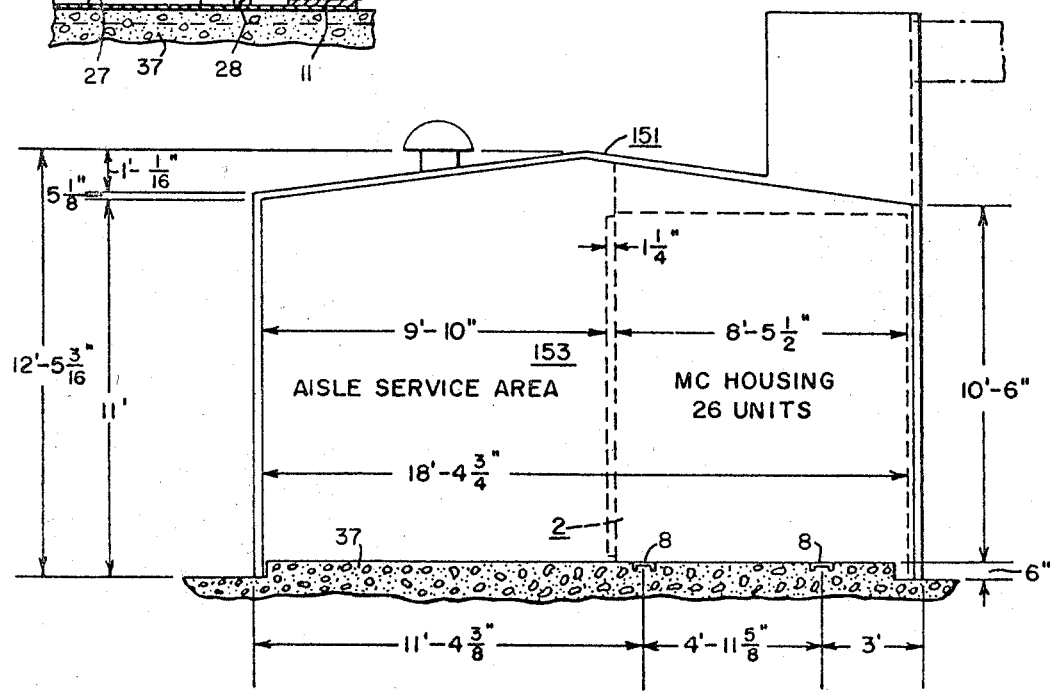

3,435,162
VERTICAL-LIFT METAL-CLAD SWITCHGEAR EQUIPMENT
John M. Kozlovic, Greensburg Pa., assignor to Westinghouse Electric Corporation, Pittsburgh, Pa., a corporation of Pennsylvania
Filed Sept. 19, 1966, Ser. No. 580,426
Int. Cl. H01h 9/20, 33/46
U.S. Cl. 200—50                      3 Claims This invention relates, generally, to metal-clad switchgear equipment, and, more particularly, to improved vertical-lift constructions for raising and lowering the circuit interrupting unit into operative and test positions within an associated cubicle structure.

A general object of the present invention is the provision of an improved lifting mechanism for the circuit breaker unit of vertical-lift types of metal-clad switchgear equipment.

Another object of the present invention is the provision of an improved cubicle construction in which the associated current transformers are so disposed as to be accessible for removal or for other purposes when the interrupting unit is removed externally of the cell structure.

Still a further object of the present invention is the provision of an improved shutter-operating mechanism for metal-clad switchgear equipment of the vertical-lift type.

Yet a further object of the present invention is the provision of an improved vertical-lift type of metal-clad switchgear equipment in which the position of the shutters is positively controlled.

Yet a further object of the present invention is the provision of an improved vertical-lift type of metal-clad switchgear equipment in which the weight associated with the circuit breaker unit is transmitted directly to the foundation and not to the framework of the cell structure.

Still a further object of the present invention is the provision of an improved guiding arrangement for the horizontal positioning of the circuit breaker unit prior to its elevation in vertical-lift types of equipment.

Yet a further object of the present invention is the provision of improved breaker lifting mechanism capable of efficiently and properly raising and lowering the associated circuite breaker unit within a cell structure.

Still a further object of the present invention is the provision of an improved lifting mechanism utilizing lifting channels having positioning means associated therewith for properly locating the associated circuit breaker unit.

Another object of the present invention is the provision of an improved lifting mechanism so arranged that the weight of the circuit breaker unit is transferred from the jackscrews through thrust bearings to bearing blocks which are welded to the cell floor so that the cell is not required to support the weight of the circuit breaker unit, the weight of the latter all being carried directly by the foundation.

Still a further object of the present invention is an improved linkage for operating the shutters of vertical-lift types of metal-clad switchgear equipment.

Another object of the present invention is the provision of improved shutter operating equipment such that it will be positively operated and safety features are incorporated therewith, which cannot be rendered inactive by maintenance personnel.

Another object of the present invention is the provision of a novel mounting means and a proper positioning of the current transformers within a cell structure such that the current transformers may be serviced while the circuit breaker unit is externally of the cell structure.

According to a preferred embodiment of the invention, there is provided a pair of horizontally spaced lifting channels which are raised and lowered in unison by four jackscrews, which are simultaneously driven by a chain drive, the chain drive being disposed adjacent the upper end of the cell structure. In addition, the lifting channels have shutter operating arms associated therewith which are guided by vertical movement of the lifting channels. The arrangement is such that raising or lowering of the lifting channels effects rotation of the shutter operating arms, with the ends of the shutter operating arms extending within slots disposed in a horizontally movable shutter plate, which is arranged to run on supporting rollers.

The arrangement is such that raising of the circuit breaker unit by upward movement of the two lifting channels automatically effects rotation of the shutter operating arms and consequently registers the openings provided in the shutter plate with the openings for the primary contacts of the cell structure.

Further objects and advantages will readily become apparent upon reading the following specification, taken in conjunction with the drawings, in which:

FIG. 4 is a view indicating the foundation supporting the cell structure;

FIG. 5 is a fragmentary view illustrating the interengagement of the lifting channels with the circuit breaker framework;

FIG. 6 illustrates the commercial application of a plurality of cell structures disposed within a suitable housing;

Figure 1:
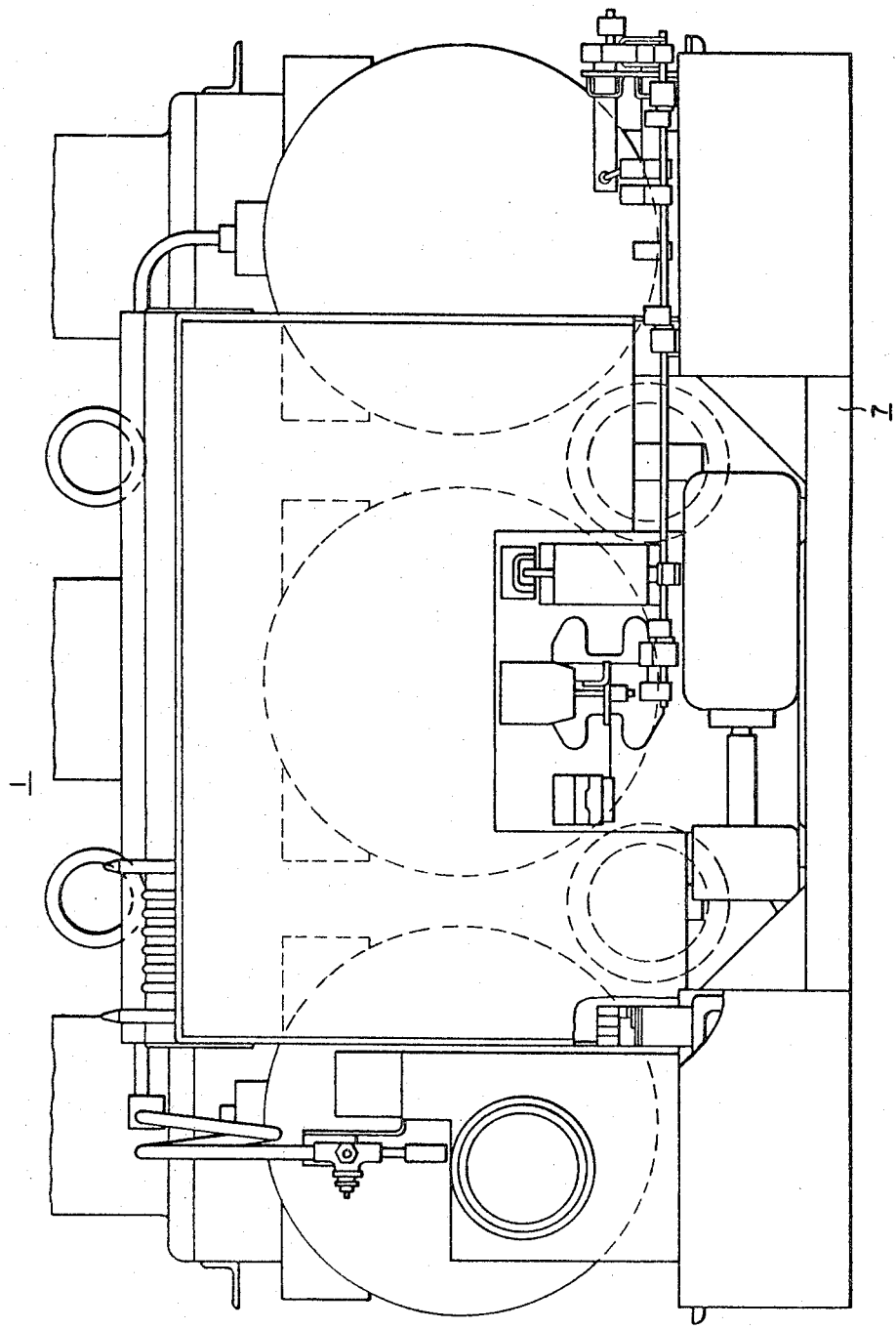
FIGURE 1 is a front elevational view of the circuit breaker unit disposed externally of the associated cell structure.
Figure 2:
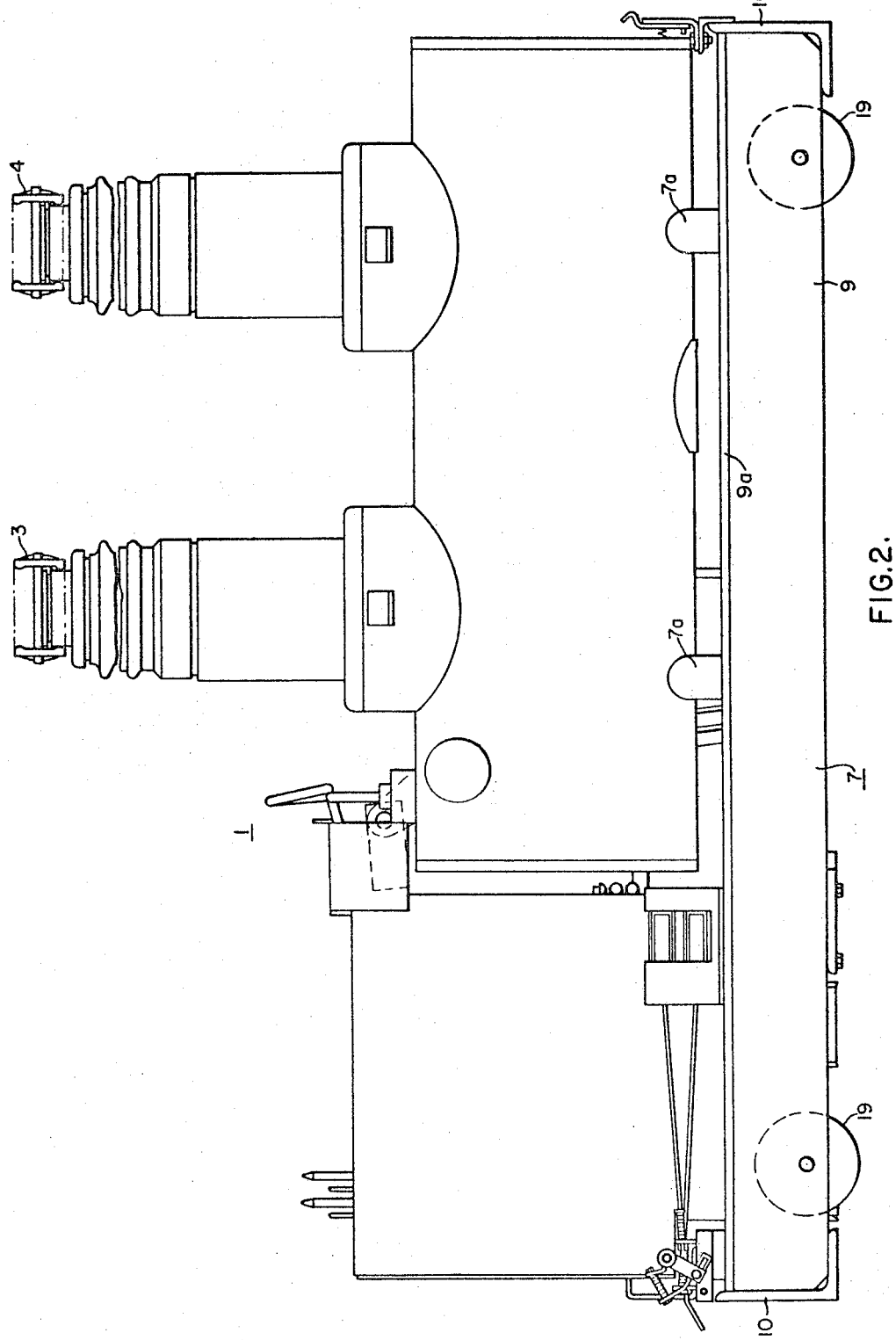
FIG. 2 is a side elevational view of the circuit breaker equipment of FIG. 1.
Figure 7:
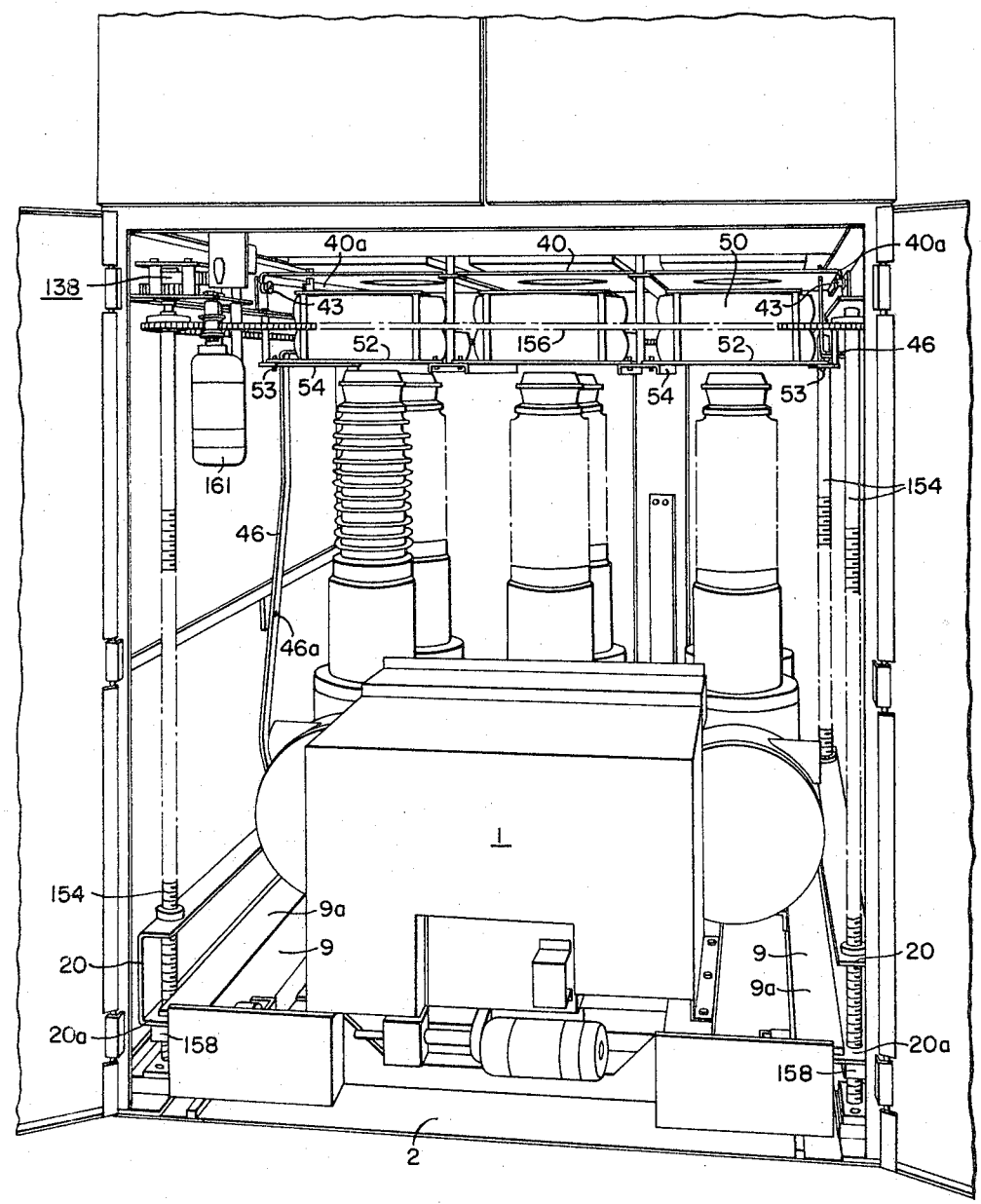
FIG. 7 is a perspective view looking into the interior of the cell structure with the circuit breaker unit in the lowered position.

Referring to the drawings, and more particularly to FIGS. 1 and 2 thereof, the reference numeral 1 indicates a three-phase truck-mounted fluid-blast circuit interrupter unit of the type, which may be rolled into an associated cell structure 2 (FIG. 7). As well known by those skilled in the art, in metal-clad switchgear equipment it is customary to have cells or cubicles 2, as shown in FIG. 7, into which are rolled removable interrupting unit equipment 1.

In more detail, with reference to FIG. 2, a frame assembly 7 is provided to support the circuit breaker 1 on support bosses 7a welded to the underside of the tanks 12. The frame assembly 7 is welded up from structural steel sections 9, 10. Rollers 19 are provided to facilitate operative movement into and out of the cooperable cell structure 2.

In the removable switchgear interrupting equipment 1, set forth in FIGS. 1 and 2, after the equipment is rolled into the associated cubicle structure 2, suitable means are provided to effect a vertical upward movement of the entire equipment 1 on vertically-movable rails, or lifting channels 20, more clearly shown in FIG. 7 of the drawings. As a result, the main movable disconnecting contacts 3, 4 may contactingly engage an associated pair of spaced stationary primary disconnecting contacts 5, 6, more clearly illustrated in FIG. 3 of the drawings, which are supported by the cubicle, or cell structure 2.

Circuit breaker equipment illustrated in FIGS. 1 and 2 per se constitutes no part of our invention and has an internal interrupting structure set forth and claimed in United States patent application filed Sept. 1, 1966, Ser. No. 576,740, by Russell E. Frink and William H. Fischer, and assigned to the assignee of the instant application. Reference may be made to the aforesaid patent application for a complete disclosure of the internal interrupting equipment, which, as mentioned, per se constitutes no part of the instant invention.

The circuit breaker unit 1 may be lifted from the disconnect, or test position, to the connected position by a motor-operated, four screw, elevating mechanism 138 mounted in the stationary cell structure 2. Guide pins 148 (FIG. 5) will ensure proper location of the breaker unit 1 upon the elevating mechanism 138, and will ensure alignment of the primary contacts 3, 5 and 4, 6. The circuit breaker unit 1 is equipped with a mechanical interlock, which prevents raising or lowering the breaker unit 1 within the stationary structure 2 without tripping open the breaker. The circuit breaker unit 1 cannot be closed when the circuit breaker unit is at any point between the connected and test positions.

As shown in FIG. 7, the removable circuit breaker unit 1 is raised to an engaged position by four jackscrews 154 in the corners of the cell 2. These jackscrews 154 are coupled together by a roller chain 156 around the top of the cell. The lower ends of the jackscrews 154 engage nuts 158, which lift the two channel-shaped members 20, which, in turn, lift the breaker unit 1 to the engaged position. Both the up and down positions of the removable circuit breaker unit 1 are controlled by limit switches, which cut off the motor 161 when the breaker is in the correct position.

The lifting frame assembly 138 comprises a pair of parallel-disposed lifting rails 20 of channel-shaped configuration which extend completely lengthwise of the breaker cell 2. The lower inwardly-extending flange 20a underlies the flange 9a of the steel section 9, as shown in FIG. 5, with the spaced guide pins 148 on the rails 20 centering in holes 162 disposed adjacent the ends of each steel angle section 9.

In the perspective view of FIG. 6, illustrating a multiplicity of such units, the circuit breaker units and the housing cell structures 151 are so designed and constructed that the three thousand ampere removable circuit breaker unit may be placed in any twelve hundred ampere housing, but mechanical interference prevents placing a twelve hundred ampere breaker in the operating position of a three thousand ampere housing.

A sheltered operating aisle 153 (FIG. 4) of ample width for handling the removable circuit breaker units, extends the length of the metal-clad switchgear equipment 151. The enclosures are weatherproof with sloping roof sections for all areas. Heating is provided in the operating area.

Figure 3:
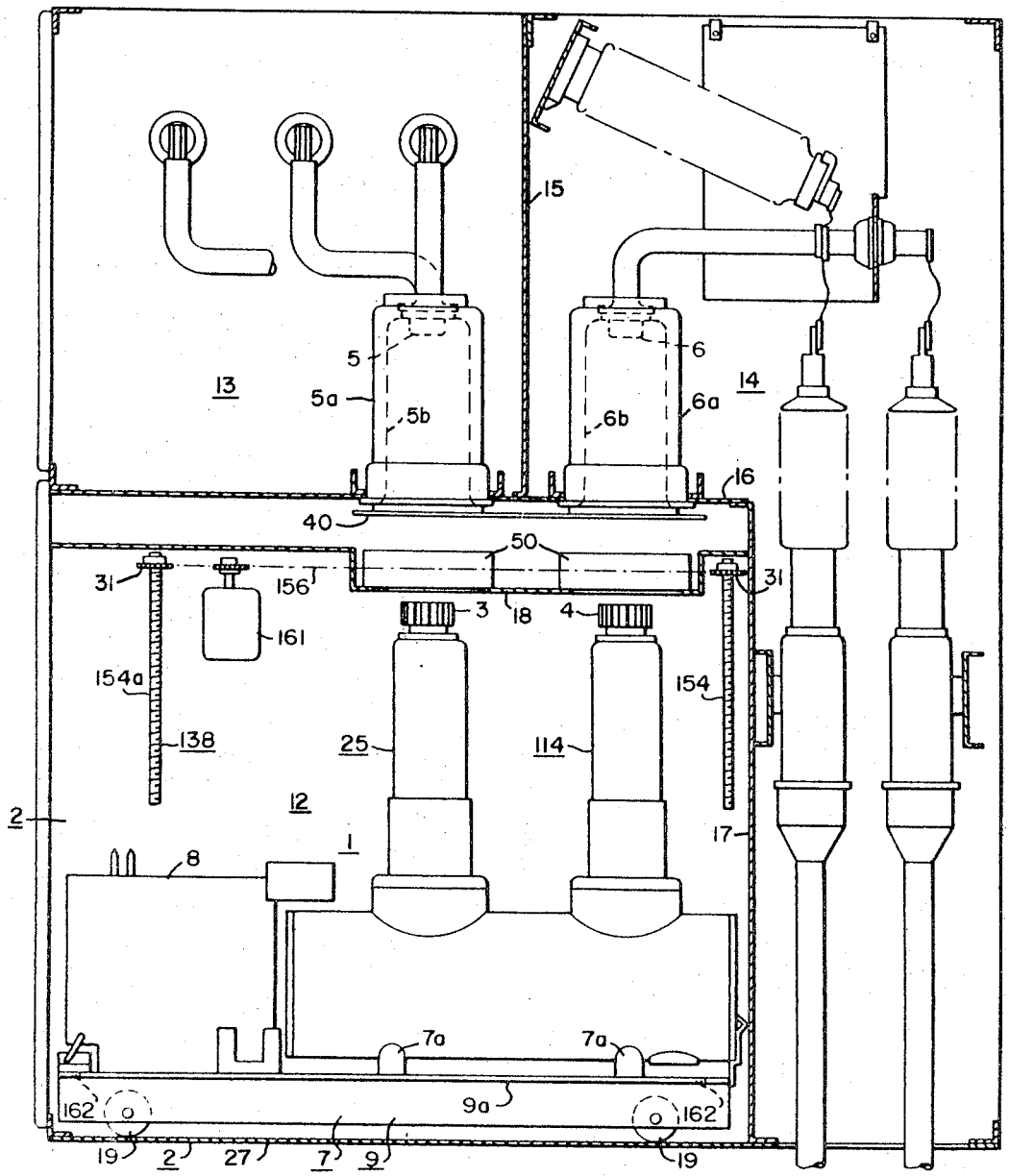
FIG. 3 is a somewhat diagrammatic view indicating the entire cell structure with the circuit breaker unit being illustrated in the lowered position.

As shown in FIG. 7, the switchgear cell 2 consists of welded steel angle iron frames which are covered with steel side sheets, floor plates, and roof sheets and closed at the front and rear with steel doors. The interior is divided into three compartments, namely a breaker compartment 12, bus compartment 13 and cable compartment 14, as shown in FIG. 3. These compartments are separated from each other by grounded metal barriers 15–18. Barrier 15, which is between the bus compartment 13 and the cable compartment 14, is made of ordinary steel for the twelve hundred ampere units and from nonmagnetic material for the three thousand ampere units. Similarly, barrier 16 is made of non-magnetic material for the three thousand ampere units.

On the front of the switchgear unit are two sets of double doors 22, 23 and 24, 25 covering the breaker compartment and are provided with a handle. The pair of doors covering the bus compartment may be bolted shut. The split door arrangement permits access to either the breaker or the bus compartment without having to expose the other compartment. The rear doors which cover the cable compartment extend the full height of the switchgear equipment.

On the floor 27 in the breaker compartment are welded a pair of steel bars 28, which are located in such a way that the breaker unit 1 is guided as it is rolled into the cell 2, the breaker wheels 19 going between the rails 28 positioning the breaker from side-to-side with respect to the primary contacts 5, 6 within the bottles 5a, 6a. The rails 28 are beveled and also the floor plate is beveled to make it easier to roll the breaker unit 1 up on the floor plate 27 and between the two guide rails 28. At the rear of the floor plate are welded two stops, which position the breaker in the correct location to be engaged by the lifting mechanism 138. At the front of the floor plate are two welded stops, which interact with matching surfaces on the twelve hundred ampere breakers to keep them from being inserted in a three thousand ampere cell.

The breaker lifting mechanism 138 consists of two lifting channels 20 with nuts 158 and driven by four jackscrews 154 by means of sprockets 31 and a horizontally extending chain 156.

With reference to FIG. 5, it will be noted that the jackscrews 154 are positioned in bearing blocks 11, which are welded to the cell floor 27. Thrust bearings are additionally utilized.

The upper ends of the jackscrews are positioned within guide plates and sleeve bearings, with one of the front jackscrews 154 extending upwardly into a gearbox 35 (FIG. 7) which provides reducing gears to slow down the motion as provided by the lifting and lowering motor 161.

It will be noted that the drive chain passing over the sprockets ensures that all four jackscrews will be moved together in an upward or lowering movement.

Preferably, the master jackscrew 154a is driven through a gear train from the motor and since all four jackscrews are connected together by the chain, they will move in unison and cause simultaneous lifting motion of the lifting channels 20, which will move up and downwardly in the cell 2 depending on the direction of rotation of the motor 161.

At each end of the lifting channels 20 are located lifting pins 148. These lifting pins match up with accurately drilled holes 162 in the breaker frame so that when the breaker is rolled into the cell 2 and the lifting mechanism 138 is started up, the pins will enter the holes in the breaker frame and position the breaker 1 accurately so that the primary contacts 3, 4 will make proper engagement with the stationary primary contacts 5, 6. The lifting channels 20 do the actual lifting of the circuit breaker unit 1.

A unique feature of the lifting mechanism is that none of the, for example, 4200 pounds of breaker weight is carried by the cell frame 36. All of the weight of the circuit breaker unit 1 is transferred from the jackscrews 154 through the thrust bearings to the bearing blocks 11, which are welded to the cell floor 27. The cell 2 rests upon a concrete foundation 37, which has steel channels 8 (FIG. 4) embedded in it under the bearing blocks 11. Thus, the cell 2 is not required to support the weight of the circuit breaker unit 1, the weight all being carried directly by the foundation 37.

Figure 8:
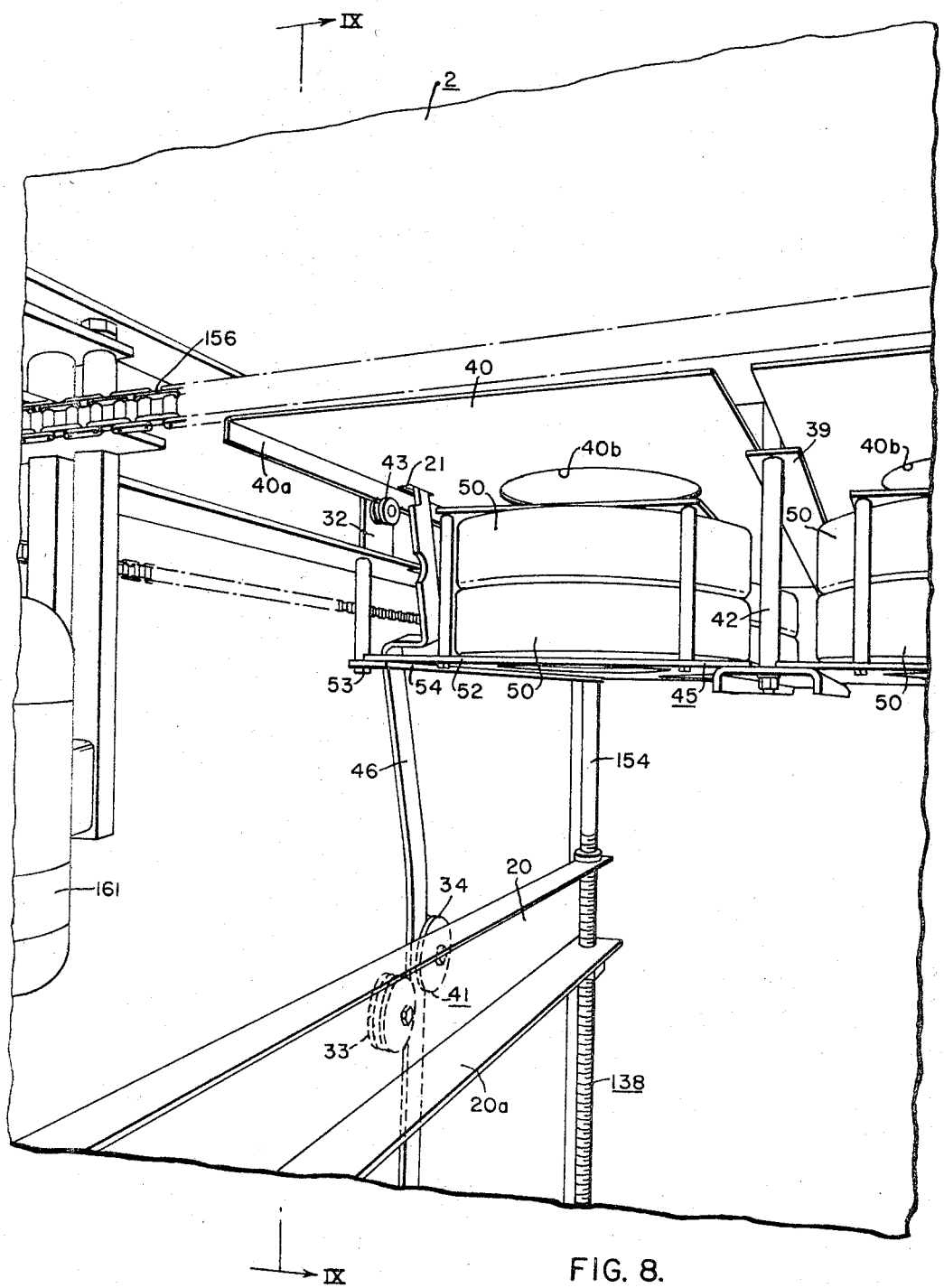
FIG. 8 is a fragmentary perspective view of the upper side portion of the interior cell structure, with the lifting channel shown in the raised position, and with the circuit breaker unit being omitted.
Figure 9:
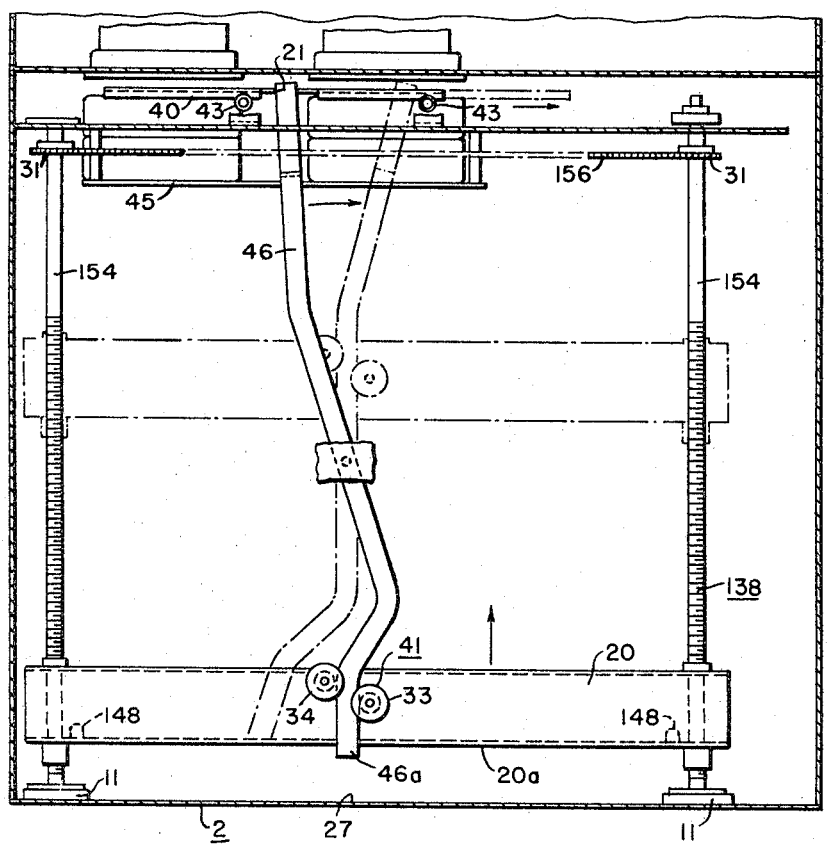
FIG. 9 is a diagrammatic view showing the interrelation between the lifting channels and the side vertically-arranged shutter-operating arms.

Suitable mechanism switches control the up and down motion of the lifting mechanism. Suitable limit switches are provided to stop the lifting mechanism when the breaker has reached the required position. Another feature of the lifting mechanism is that it will not start to raise the breaker unit 1 until it is in the proper position so that the breaker bushings will pass through the current transformers 50 and line up with the primary contacts in the cell 2. A shutter plate 40 is provided as shown more clearly in FIGS. 7 and 8 of the drawings. With reference to FIG. 8, it will be observed that the shutter plate 40 has downwardly extending flanges 40a at its outer ends, which are guided by stationary rollers 43. There is provided a pair of pivotally mounted shutter operating arms 46, as more clearly shown in FIG. 7, the upper ends of which extend through slots 21 (FIG. 8) provided in the outer sides of the shutter plate 40. The lower ends of the arms 46 are guided by rollers 33, 34 (FIG. 8) movable with the lifting channels 20 so that the raising and lowering of the lifting channels 20 will automatically effect rotation of the shutter operating arms 46, and consequently effect horizontal movement of the shutter plate 40. Such movement will, of course, cause registration between the holes 40b provided in the horizontally movable shutter plate 40 and the openings 5b, 6b (FIG. 3) provided in the lower ends of the bottles 5a, 6a.

The shutter plate 40 is made of non-magnetic material and, as shown, is located at the top of the breaker compartment 12 between the primary contact support bottles and the current transformers 50. As mentioned, the edges of the shutter plate 40 are bent down to form guiding edges, which seat in grooves provided in the stationary rollers 43, which are mounted to a suitable cell channel by brackets 32 (FIG. 8). This combination of rolling surfaces and the rollers support and guide the shutter 40 making it easy for the latter to move from a closed to an open position. Because of the size of the shutter 40, it is further supported from sagging by support bars 39, which are mounted over studs 42 forming a part of the current transformer mounting arrangement 45.

When the breaker is down or removed from the cell, the shutter 40 is held in the closed position by the lower ends 46a of the shutter arms 46 between the rollers 33, 34 provided on the lifting channels 20. As a result, the shutter plate 40 cannot be opened in this position. A very outstanding feature of this type of shutter arrangement is that it cannot be opened when the breaker is out of the cell 2. Operating or maintenance personnel cannot walk into a cell, open the shutter 40 and contact the live primary contacts 5, 6. The shutter operating mechanism 41 is, as a result, positive in operation. There are no springs or pulleys which use an action dependent upon gravity.

It will be noted that the current transformers 50 are mounted below the shutter plate 40 and can be changed with complete safety because the shutter 40 is between them and the primary contacts 5, 6.

With reference to FIG. 8 of the drawings, it will be noted that the current transformers 50 are supported from removable plates 52, the latter being bolted, as at 53, to shelve structures 54. As a result, by removing the bolts 53, the individual plates 52 may be laterally moved out of the supports and serviced.

From the foregoing description of the invention, it will be apparent that there has been provided an improved lifting mechanism 138 for a metal-clad type of vertical-lift switchgear unit, together with the incorporation therewith of a novel shutter operating mechanism 41 which is positively controlled.

It will be noted that the disposition of the sprockets and the chain drive at the upper end of the breaker cell 2 positions the drive mechanism 138 in a position out of the way, and does not interfere with the proper operation of the circuit breaker unit 1.

As mentioned previously, the weight of the circuit breaker unit 1 is transmitted directly from the lifting channels 20 to the jackscrews 154 and directly to the foundation 37 and not through the framework 36 of the associated cell structure 2.

Although there has been illustrated and described a specific structure, it is to be clearly understood that the same was merely for the purpose of illustration, and that changes and modifications may readily be made therein by those skilled in the art without departing from the spirit and scope of the invention.

I claim as my invention:

1. In vertical-lift metal-clad switchgear equipment, cell means (2) defining a circuit-breaker compartment having upper-disposed stationary primary disconnecting contacts, horizontally-movable shutter means (40) for opening and closing the openings to said stationary primary disconnecting contacts, a pair of horizontally-spaced vertically movable lifting channels (20) disposed in said circuit-breaker compartment (2) and carrying an associated circuit-breaker unit (1) upwardly and downwardly to operative and test positions, at least one vertically-arranged pivotally-mounted shutter-operating arm (46) having the lower end thereof guided by movable guide means on one lifting channel (20) and having the upper end thereof operatively associated with said horizontally-movable shutter means (40), whereby upward movement of said pair of lifting channels (20) will rotate said vertically-arranged shutter-operating arm (46) and thereby effect horizontal opening movement of said shutter means (40).

2. The combination of claim 1, wherein two such shutter operating arms are provided, which extend into openings provided in said shutter means.

3. The combination of claim 1, wherein the shutter operating arm is stationarily mounted to the side wall of the circuit-breaker compartment.

References Cited

UNITED STATES PATENTS

| | | | |
|---|---|---|---|
| 2,343,518 | 7/1944 | Specht | 200—50 |
| 3,015,756 | 1/1962 | Kreekon et al. | |

ROBERT K. SCHAEFER, *Primary Examiner.*

H. J. HOHAUSER, *Assistant Examiner.*